(12) United States Patent
Lin et al.

(10) Patent No.: US 8,834,001 B2
(45) Date of Patent: Sep. 16, 2014

(54) LIGHT GUIDE PLATE AND EDGE LIGHT BACKLIGHT DEVICE

(71) Applicant: Chi Mei Corporation, Tainan (TW)

(72) Inventors: Cheng-Feng Lin, Tainan (TW); Chun-Liang Kuo, Tainan (TW); Hsin-Hung Chen, Tainan (TW)

(73) Assignee: Chi-Mei Corporation, Tainan (TW)

( * ) Notice: Subject to any disclaimer, the term of this patent is extended or adjusted under 35 U.S.C. 154(b) by 35 days.

(21) Appl. No.: 13/714,810

(22) Filed: Dec. 14, 2012

(65) Prior Publication Data

US 2013/0155722 A1    Jun. 20, 2013

(30) Foreign Application Priority Data

Dec. 16, 2011    (TW) .............................. 100146841 A

(51) Int. Cl.
 *F21V 8/00*    (2006.01)
(52) U.S. Cl.
 CPC .................................... *G02B 6/0011* (2013.01)
 USPC ............ 362/612; 362/615; 362/619; 362/626
(58) Field of Classification Search
 CPC ............................. G02B 6/0011; G02B 6/0068
 USPC .................. 362/612, 615, 619, 626
 See application file for complete search history.

(56) References Cited

U.S. PATENT DOCUMENTS

| 7,278,772 | B2 * | 10/2007 | Kunimochi | 362/619 |
| 7,591,580 | B2 * | 9/2009 | Maeda et al. | 362/625 |
| 2010/0202147 | A1 * | 8/2010 | Wang et al. | 362/355 |

OTHER PUBLICATIONS

Korean International Property Office, Office Action and English Translation for Counterpart Application No. KR1020120146003, and Cited References and English Translations of KR20110032491 and KR1020110021315.
Japanese Patent Office, Notice of Allowance for Counterpart Application No. JP2012273405. And Cited References and English Translations for JP2011175965, JP2008296587, JP2009301805; JP2011249060, JP2009266819, and WO2010058845.

* cited by examiner

*Primary Examiner* — Elmito Breval
(74) *Attorney, Agent, or Firm* — Shook Hardy & Bacon LLP

(57) ABSTRACT

An edge light backlight device includes a light guide plate having a base portion and microstructures, LEDs, and a reflective plate. The base portion has a light emitting side, a rear side, and a light incident side. The microstructures are formed on one of the light emitting side and the rear side and each of which extends from the light incident side in a longitudinal direction. Each of the microstructures includes a curved surface with a radius of curvature (R). The light guide plate has a thickness (T). R/T ratio ranges from 0.04 to 0.15 and each of the microstructures has a height ranging from 20 μm to 300 μm so that the light guide plate has a performance of local lighting ranging from 1% to 40%.

11 Claims, 6 Drawing Sheets

LIGHT GUIDE PLATE AND EDGE LIGHT BACKLIGHT DEVICE

CROSS-REFERENCE TO RELATED APPLICATION

This application claims priority of Taiwanese Patent Application No. 100146841, filed on Dec. 16, 2011, the disclosure of which is incorporated herein by reference.

BACKGROUND OF THE INVENTION

1. Field of the Invention

This invention relates to a light guide plate and an edge light backlight device containing the light guide plate, more particularly to a light guide plate and an edge light backlight device with superior local dimming effect.

2. Description of the Related Art

Currently, planar light units, cold cathode fluorescent lamps (CCFL), light-emitting diodes (LEDs), etc., are used as a light source for a backlight device of a liquid crystal display (LCD). With the raising concerns over environmental issues, LEDs with low energy consumption are widely used as a light source for LCDs.

Dynamic contrast ratio of a LCD can be improved by combination of LEDs as a backlight light source with a local dimming technique. LEDs are divided into a plurality of small sections to perform local dimming control. The local dimming technique is a technique enabling a backlight device to achieve different degrees of luminance and lighting variance in the different sections. Since LEDs have low power consumption and rapid switching speed, the same are suitable for application in local dimming technique.

However, because of point source characteristics of LEDs, light generated by LEDs is not directional light so that light entering a light guide plate is incomplete and uneven.

FIGS. 1 and 2 illustrate a conventional edge light backlight device including a light guide plate 7, a plurality of LEDs 8, a reflective plate (not shown) located underneath the light guide plate 7, and a prism sheet (not shown) located above the light guide plate 7. The light guide plate 7 has a light incident side 71 and a light emitting side 72. The light emitted by the LEDs 8 enters the light guide plate 7 through the light incident side 71 and undergoes reflection and refraction before emitting out of the light emitting side 72. A driving unit (not shown) is adapted to control the on/off modes of the LEDs 8 to perform local dimming. When a portion A of a screen needs to be bright and another portion B of the screen is otherwise dark, the driving unit controls the LEDs 8 near the portion A to be on and the LEDs 8 near the portion B to be off.

For a conventional backlight device, since there is no special structure to concentrate the light emitted from the light emitting side 72 of the light guide plate 7, light from the LEDs 8 near the portion A is likely to leak to the dark portion B, thereby causing halation and blurred motion image.

SUMMARY OF THE INVENTION

An object of this invention is to provide a light guide plate with superior performance of local lighting.

Another object of this invention is to provide an edge light backlight device including the light guide plate which has better local dimming effect.

According to a first aspect of this invention, there is provided a light guide plate including a base portion and a plurality of microstructures. The base portion has a light emitting surface, a rear surface opposite to the light emitting side, and a light incident side connecting the light emitting side and the rear side. The microstructures are formed on one of the light emitting surface and the rear surface and extend from the light incident side in a longitudinal direction. Each of the microstructures includes a curved surface with a radius of curvature (R). The light guide plate has a thickness (T). In the light guide plate, R/T ratio ranges from 0.04 to 0.15, and each of the microstructures has a height ranging from 20 μm to 300 μm from one of the light emitting surface and the rear side on which the microstructures are formed so that the light guide plate has a performance of local lighting ranging from 1% to 40%.

According to a second aspect of this invention, there is provided an edge light backlight device including the light guide plate, a plurality of LEDs, and a reflective plate. The LEDs are aligned along and are operable to emit light toward the light incident side of the base portion of the light guide plate. The reflective plate is located underneath the rear side of the light guide plate.

BRIEF DESCRIPTION OF THE DRAWINGS

Other features and advantages of the present invention will become apparent in the following detailed description of the embodiments with reference to the accompanying drawings, of which.

DETAILED DESCRIPTION OF THE PREFERRED EMBODIMENTS

Figure 1:
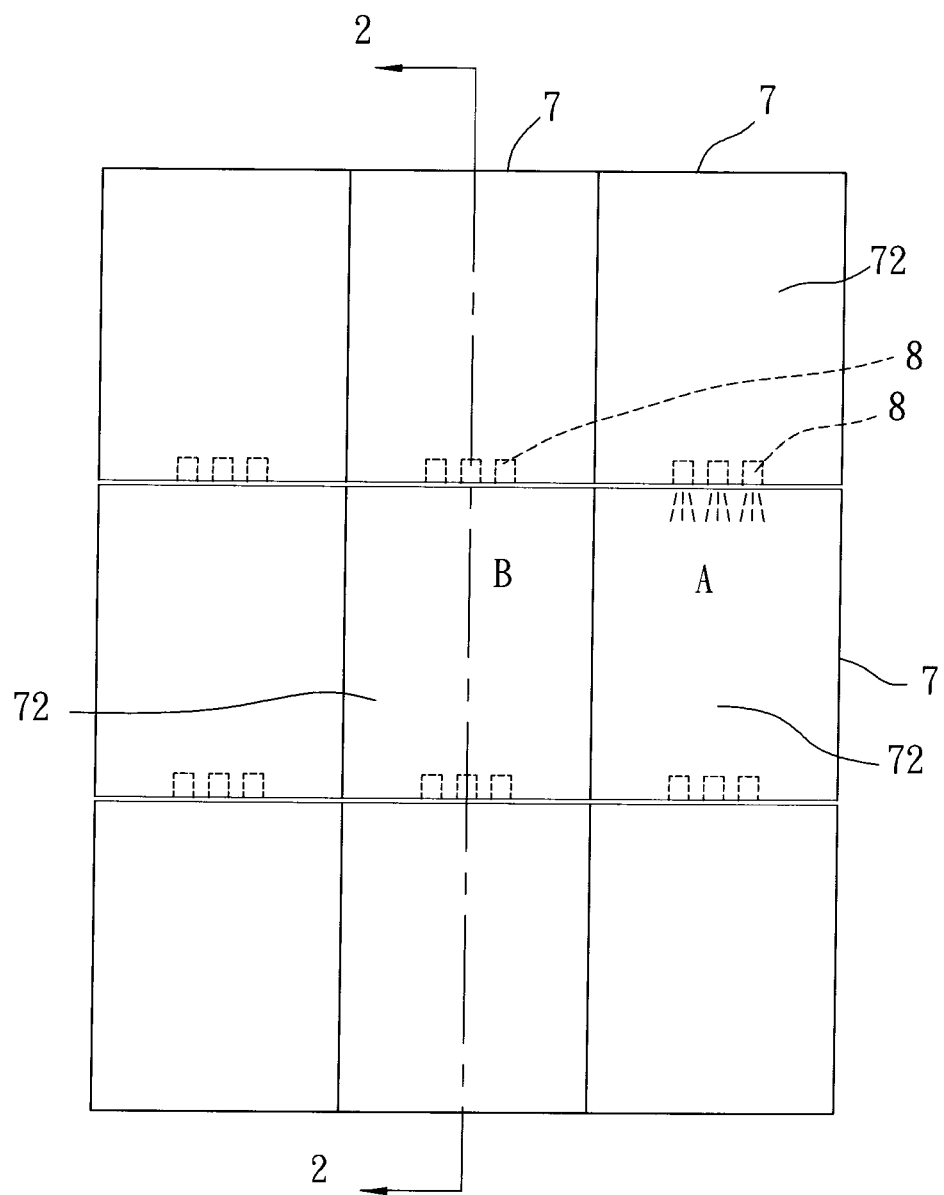
FIG. 1 is a top view of a conventional edge light backlight device.
Figure 2:
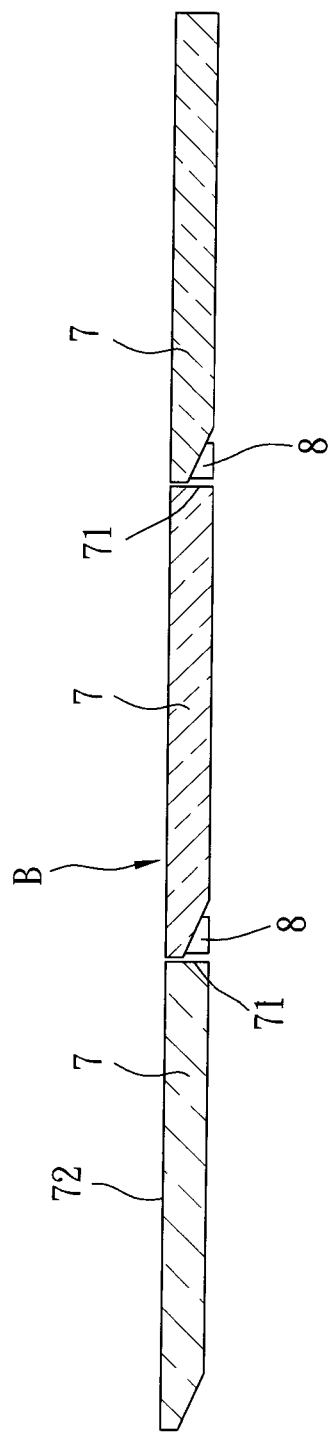
FIG. 2 is a cross-sectional view of the conventional edge light backlight device shown in FIG. 1.
Figure 3:
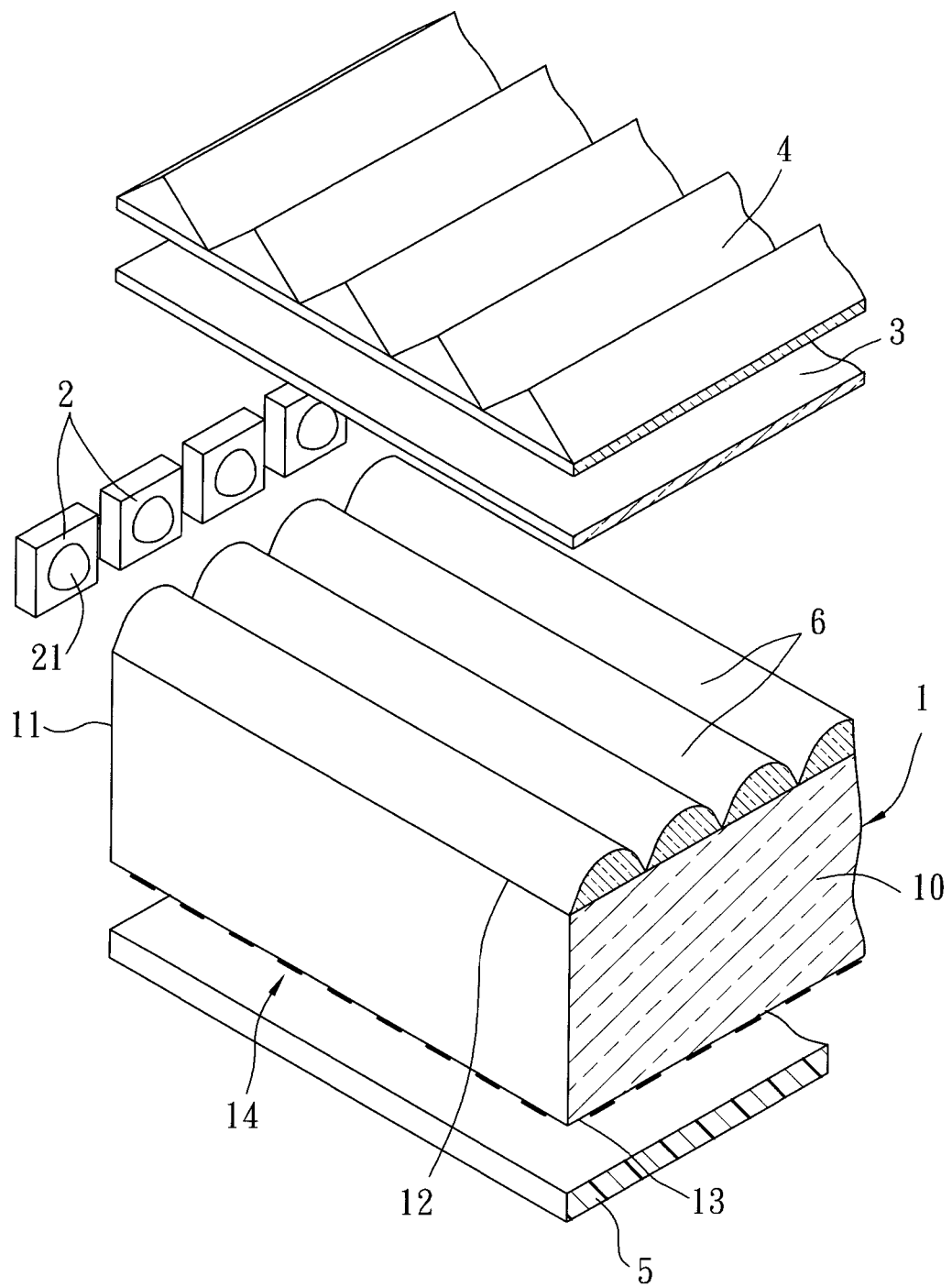
FIG. 3 is an exploded perspective view of the preferred embodiment of an edge light backlight device according to this invention.
Figure 4:
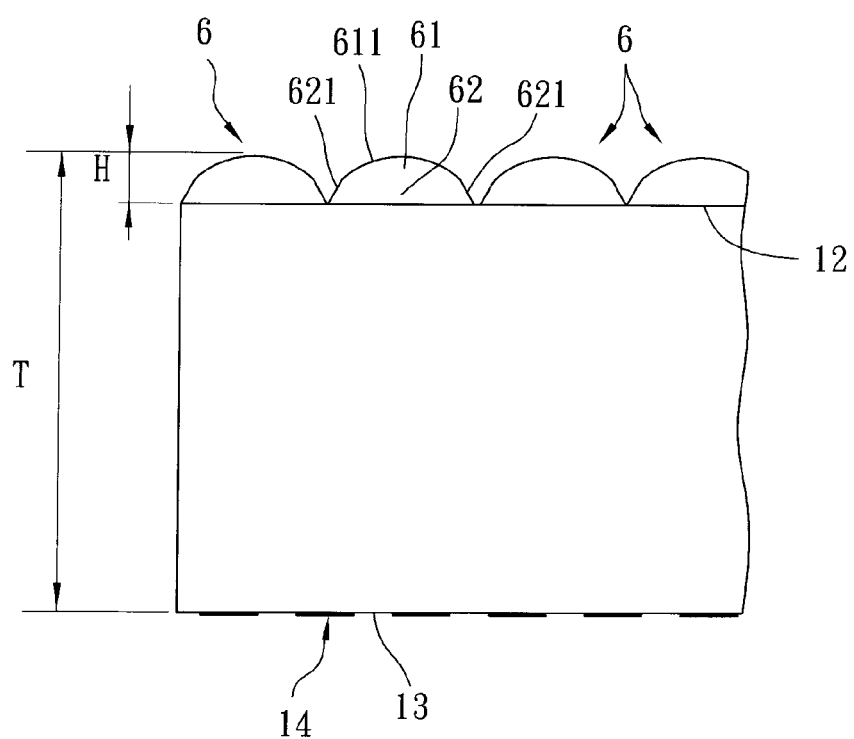
FIG. 4 is a side view of the preferred embodiment shown in FIG. 3, showing a light guide plate and a dot pattern.

Referring to FIGS. 3 and 4, an edge light backlight device according to the preferred embodiment of the present invention is shown to include a light guide plate 1, a plurality of LEDs 2, a diffuser 3, a prism sheet 4, and a reflective plate 5.

The light guide plate 1 includes a plurality of microstructures 6 and a base portion 10. The base portion 10 has a light emitting side 12, an rear side 13 opposite to the light emitting side 12, and a light incident side 11 connecting the light emitting side 12 and the rear side 13. The microstructures 6 are formed on one of the light emitting side 12 and the rear side 13. Each of the microstructures 6 extends from the light incident side 11 in a longitudinal direction, and has a first structural portion 61 and a second structural portion 62 disposed underneath the first structural portion 61. The microstructures 6 can be arranged to be a lenticular lens or a Fresnel lens. In this embodiment, the microstructures 6 are arranged to be a lenticular lens and are disposed on the light emitting side 12. The first structural portion 61 having a curved surface 611, and the second structural portion 62 is in the form of a trapezoid and has two opposite inclined surface 621 extending outwardly and downwardly from the curved surface 611 to the base portion 10. Alternatively, the second structural portion 62 may be dispensed with in other embodiments of this invention. Thus, each of the microstructures 6 may only have the first structural portion 61 without the second structural portion 62.

Each of the microstructures 6 includes the curved surface 611 with a radius of curvature (R). The light guide plate 1 has a thickness (T) which is measured from the top of the microstructure 6 to the rear side 13. In the light guide plate 1, R/T ratio ranges from 0.04 to 0.15 and each of the microstructures 6 has a height (H) ranging from 20 μm to 300 μm so that the light guide plate 1 has a performance of local lighting (to be defined later) ranging from 1% to 40% to obtain a desirable local dimming effect. Preferably, the thickness (T) of the light guide plate 1 ranges from 0.1 mm to 5 mm, more preferably from 1.0 mm to 3 mm.

The light guide plate 1 is made of a thermoplastic resin selected from the group consisting of (meth)acrylic acid ester, polystyrene, polycarbonate, methyl methacrylate-styrene copolymer, acrylonitrile-styrene copolymer, and polyethylene terephthalate. In this invention, the (meth)acrylic acid ester includes acrylic acid ester and/or methyl acrylic acid ester which are composed of (meth)acrylic acid ester. The (meth)acrylic acid ester is referred to as acrylic acid ester and/or methyl acrylic acid ester. Examples of the (meth) acrylic acid ester include, but are not limited to, methyl methacrylate, ethyl methacrylate, isopropyl methacrylate, n-butyl acrylate, methyl acrylate, ethyl acrylate, and isopropyl acrylate. Preferably, the (meth)acrylic acid ester is methyl methacrylate and methyl acrylate.

The thermoplastic resin can be optionally added with additives, such as a diffusion agent, a fluorescence agent, an ultraviolet absorbent, an antioxidant, or the like. Examples of the diffusion agent include inorganic particle and organic particle. The inorganic microparticle can be made from barium sulfate ($BaSO_4$), titanium dioxide ($TiO_2$), or the like. The organic particle can be made from polystyrene, (meth) acrylic acid, siloxane resin, or the like.

In this invention, the microstructures 6 are used to concentrate light toward a front side of a panel and prevent light from emitting outwardly at a relatively large refractive angle, thereby improving the performance of local lighting of the backlight device. The microstructures 6 are formed on the light emitting side 12 or the rear side 13 of the base portion 10 of the light guide plate 1 by stamper transferring process or roller transferring process. In the stamper transferring process, a shaped die is pressed on a surface of a substrate at an elevated temperature so as to form microstructures on the surface. In the roller transferring process, a resin or two kinds of resins is/are extruded to form a single layer or a laminate, and then a desired shape is transferred onto the single layer or the laminate using an embossing roller at an elevated temperature so as to form microstructures on the single layer or the laminate.

The LEDs 2 are aligned along and are operable to emit light toward the light incident side 11 of the base portion 10 of the light guide plate 1. Each of the LEDs 2 can be viewed as a local dimming unit. An improved performance of local lighting can be obtained when light emitted by the LEDs 2 passes through the specially designed microstructures 6 of the light guide plate 1. By virtue of the improved performance of local lighting of the light guide plate 1 in combination with the property of a fast on/off switching and a freedom of arrangement in different sections for the LEDs 2, persistence of vision of human eyes and LCD trailing smear problems can be solved by using a progressive scanning method of the LEDs 2.

The diffuser 3 is disposed above the light emitting side 12 of the base portion 10 of the light guide plate 1 and is used to diffuse light so as to obtain uniform light. The prism sheet 4 is disposed above the diffuser 3 and has a function of light concentration.

The reflective plate 5 is located underneath the rear side 13 of the light guide plate 1. The reflective plate 5 serves to reflect light from the rear side 13 into the light guide plate 1, thereby enhancing the amount of light emitting from the light emitting side 12 of the light guide plate 1. The reflective plate 5 preferably has an inclined reflective surface. For example, the reflective surface of the reflective plate 5 is inclined from a center to a periphery of the reflective plate 5, i.e., a convex surface, or is inclined from one side to an opposite side of the reflective plate 5. Preferably, the reflective surface of the reflective plate 5 has an inclined angle smaller than 30°, more preferably smaller than 20°, and most preferably smaller than 10°. The reflective plate 5 is preferably formed with a matte surface or a holographic surface. The matte surface is formed by processing a matte treatment on the reflective surface, while the holographic surface is formed using a laser or an embossing hologram.

Furthermore, there is a dot pattern 14 located on either the light emitting side 12 or the rear side 13 of the base portion 10 of the light guide plate 1. In the preferred embodiment of this invention, the dot pattern 14 is located on the rear side 13. The dot pattern 14 can be manufactured by a printing method or a non-printing method. For the printing method, a highly reflective material that is not light-absorbing is coated onto the light guide plate 1 followed by screen printing to form the circular or rectangular dot pattern 14. A non-limiting example of the dot pattern material is white titanium dioxide powder mixed with transparent adhesive solution. For the non-printing method, small amount of particulate materials with various reflective indices is added into a thermoplastic resin followed by injection molding to form the dot pattern 14 on the light guide plate 1.

Theoretically, each of the curved surfaces 611 of the microstructures 6 could be made into a circular arc. To measure a radius of curvature of the circular arc, two tangent points on the circular arc are selected. Draw two tangent lines passing through the two tangent points respectively and then draw two normal lines each of which is perpendicular to a corresponding one of the tangent lines. The intersection of the two normal lines is defined as a center. A distance from one of the tangent points to the center is defined as the radius of curvature of the circular arc. In practice, owing to production error, each of the curved surfaces 611 might be a connection of a plurality of arc surfaces with different radiuses of curvature. However, the differences between the radiuses of curvature are not significant.

Figure 5:
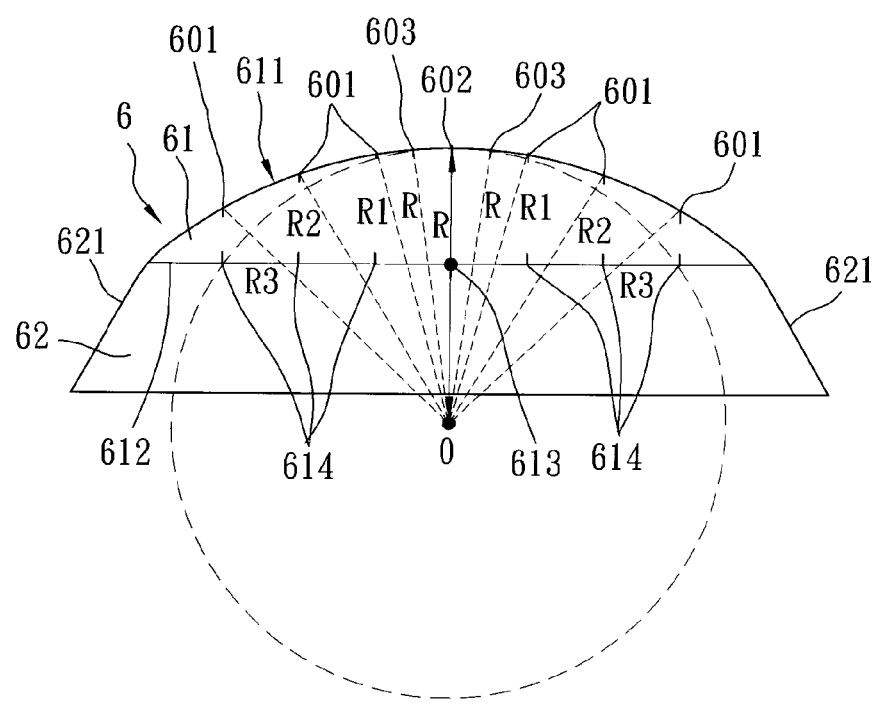
FIG. 5 is an enlarged sectional view showing a microstructure of the light guide plate of the preferred embodiment.

Referring to FIG. 5, the first structural portion 61 has a curved surface 611 and an imaginary cross sectional straight line 612 interconnecting two opposite points of the curved surface 611. The cross sectional straight line 612 is divided into eight equal parts by a center point 613 and six points 614. The curved surface 611 has a point 602 corresponding to the center point 613 and six points 601 corresponding to the points 614 on the cross sectional straight line 612. In the embodiment of this invention, the curved surface 611 has a circular arc with two end points 603 respectively located between the point 602 and two most adjacent points 601. The circular arc is a part of an imaginary circle with a center O and a radius. The radius corresponds to a radius of curvature R of the arc. The radius of curvature R is also the distance between the point 602 and the center O. Distances between the center O of the circular arc and the points 601 on the curved surface 611 are respectively defined as R1, R2, and R3, and the relationship thereof is defined below:

$|R-R1|<10$ μm, $|R1-R2|<10$ μm, and $|R2-R3|<10$ μm.

When the backlight device is in use, light emitted from the LEDs 2 enters into the light guide plate 1 through the light incident side 11. The light is reflected by the dot pattern 14 and the reflective plate 5 toward the light emitting side 12 and then emits outwardly. Owing to the specific design for R/T ratio and the height (H) of the microstructures 6, the light guide plate 1 has better performance of local lighting so that the light would emit at a relatively limited angle to obtain good performance of local lighting, thereby achieving superior local dimming effect.

Figure 6:
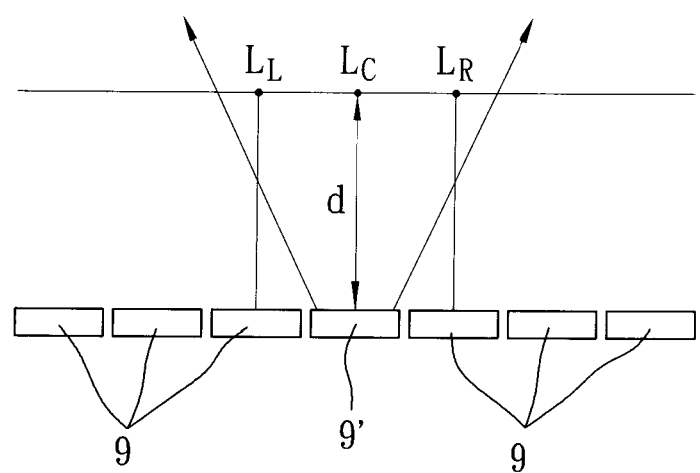
FIG. 6 is a schematic diagram illustrating measurement of performance of local lighting.

The definition for the "performance of local lighting" of this invention will be described below. FIG. 6 shows a central light source 9' and several side light sources 9, and the light from the central and side light sources 9, 9' emits upwardly. The central luminance intensity of the central light source 9' is referred to as $L_C$; whereas the left and right luminance intensities of the central light source 9' are, respectively, referred to as $L_L$ and $L_R$. $L_C$ is measured at a position located directly above the central light source 9' by a distance (d) from the central light source 9'. $L_L$ is measured at a position located directly above one of the side light sources 9 by a distance (d) from said side light source 9. Said side light source 9 is at a left side of the central light source 9' and is immediately adjacent to the central light source 9'. $L_R$ is measured at a position located directly above another one of the side light sources 9 by a distance (d). Said another one of the side light sources 9 is at a right side of the central light source 9' and is immediately adjacent to the central light source 9'. A non-limiting example of the distance (d) ranges from 1.5 m to 2 m. The unit of luminance intensity is in candela per square meter (cd/m$^2$). The performances of local lighting is defined as $\{[(L_L+L_R)/2]/L_C\} \times 100\%$.

Smaller performance of local lighting means better performance of local lighting and superior local dimming effect without interference from adjacent light source. In this invention, the $L_C$, $L_R$, and $L_L$ should be measured after incident lights are reflected toward the light emitting side 12 by the dot array pattern 14 and the reflective plate 5.

The following examples and comparative examples are used to prove the effect of this invention.

Table 1 shows the thickness (T) of the light guide plate 1, the height (H) and the radius of curvature (R) of the microstructures 6, the R/T ratio, and the performance of local lighting of Examples 1 to 10 (E1 to E10) and Comparative Examples 1 and 2 (CE1 and CE2).

TABLE 1

| Example | T (mm) | H (μm) | R (μm) | R/T | Performance of Local Lighting (%) |
|---|---|---|---|---|---|
| E1 | 3 | 52 | 234 | 0.078 | 36 |
| E2 | 3 | 75 | 191 | 0.064 | 24 |
| E3 | 3 | 90 | 171 | 0.057 | 17 |
| E4 | 3 | 110 | 159 | 0.053 | 11 |
| E5 | 3 | 120 | 153 | 0.051 | 9 |
| CE1 | 3 | 0 | — | — | 69 |
| E6 | 2 | 50 | 295 | 0.148 | 28 |
| E7 | 2 | 70 | 196 | 0.098 | 14 |
| E8 | 2 | 90 | 175 | 0.088 | 10 |
| E9 | 2 | 112 | 158 | 0.079 | 9 |
| E10 | 2 | 127 | 152 | 0.076 | 6 |
| CE2 | 2 | 0 | — | — | 68 |

The parameters of E1 to E5 fall within the limitations of this invention, that is, R/T ranging from 0.04 to 0.15 and the height (H) ranging from 20 μm to 300 μm. With increasing height (H) and decreasing R/T, the performance of local lighting range from 36% in E1 to 9% in E5, which indicates that the backlight device of this invention exhibits superior performance of local lighting, thereby achieving light local dimming effect. The backlight device of CE1 was not provided with microstructures and thus no performance of local lighting was achieved. The performance of local lighting for CE1 was 69%, and there was serious interference between light sources in two adjacent areas. From the data of E6 to E10 and CE2, the results also demonstrate that, within the ranges defined in this invention, the performance of local lighting can be reduced, thereby achieving efficient performance of local lighting. The backlight device of CE2 that was not provided with microstructures had undesirable performance of local lighting.

Based on the abovementioned experimental results, lower performance of local lighting is obtained with higher microstructure height (H) and lower R/T ratio when the thickness (T) of the light guide plate 1 is fixed. Lower performance of local lighting means good light concentration effect, which indicates superior local dimming ability, better average luminescence, and better performance of the backlight device.

While the present invention has been described in connection with what are considered the most practical embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An edge light backlight device, comprising:
   a light guide plate including a base portion that has a light emitting side, a rear side opposite to said light emitting side, and a light incident side connecting said light emitting side and said rear side, and a plurality of microstructures that are formed on one of said light emitting side and said rear side and each of which extends from a longitudinal direction of said light incident side, each of said microstructures including a curved surface with a radius of curvature (R), said light guide plate having a thickness (T);
   a plurality of LEDs aligned along and operable to emit light toward said light incident side of said base portion of said light guide plate; and
   a reflective plate located underneath said rear side of said light guide plate;
   wherein, in said light guide plate, R/T ratio ranges from 0.04 to 0.15 and each of said microstructures has a height ranging from 20 μm to 300 μm from one of said light emitting side and said rear side on which said microstructures are formed so that said light guide plate has a performance of local lighting ranging from 1% to 40%.

2. The edge light backlight device as claimed in claim 1, wherein one of said light emitting side and said rear side has a dot pattern.

3. The edge light backlight device as claimed in claim 1, further comprising a diffuser located above said light emitting side of said base portion of said light guide plate.

4. The edge light backlight device as claimed in claim 3, further comprising a prism sheet located above said diffuser.

5. The edge light backlight device as claimed in claim 1, wherein the thickness (T) of said light guide plate ranges from 0.1 mm to 5 mm.

6. The edge light backlight device as claimed in claim 1, wherein said light guide plate is made of a thermoplastic resin selected from the group consisting of acrylic acid ester based resin, methacrylate ester based resin, polystyrene resin, polycarbonate resin, methyl methacrylate-styrene copolymer, acrylonitrile-styrene copolymer, and polyethylene terephthalate.

7. The edge light backlight device as claimed in claim 1, wherein said microstructures are arranged to be one of a lenticular lens and a Fresnel lens.

8. A light guide plate comprising:
a base portion having a light emitting side, a rear side opposite to said light emitting side, and a light incident side connecting said light emitting side and said rear side; and
a plurality of microstructures formed on one of said light emitting side and said rear side and extending from said light incident side in a longitudinal direction parallel to said light emitting side, each of said microstructures including a curved surface with a radius of curvature (R), said light guide plate having a thickness (T);
wherein, in said light guide plate, R/T ratio ranges from 0.04 to 0.15 and each of said microstructures has a height ranging from 20 µm to 300 µm from one of said light emitting side and said rear side on which said microstructures are formed so that said light guide plate has a performance of local lighting ranging from 1% to 40%.

9. The light guide plate as claimed in claim 8, wherein one of said light emitting side and said rear side has a dot pattern.

10. The light guide plate as claimed in claim 8, wherein said light guide plate has a thickness ranging from 0.1 mm to 5 mm.

11. The light guide plate as claimed in claim 8, wherein said microstructures are one of a lenticular lens and a Fresnel lens.

\* \* \* \* \*